United States Patent Office.

IMPROVEMENT IN THE WELDING OF IRON AND STEEL.

JOHN P. PRICE, OF PHILADELPHIA, PENNSYLVANIA, ASSIGNOR TO FRANK K. HIPPLE, OF SAME PLACE.

Letters Patent No. 60,420, dated December 11, 1866.

---

*The Schedule referred to in these Letters Patent and making part of the same.*

---

TO ALL WHOM IT MAY CONCERN:

Be it known that I, JOHN P. PRICE, of Philadelphia, Pennsylvania, have invented an Improvement in the Welding of Iron or Steel; and I do hereby declare the following to be a full, clear, and exact description of the same.

The nature of my invention consists in welding iron or steel by the aid of cryolite, which is first ground or pulverized; its impurities, or most of its impurities, removed; after which it is ready for use, in the same manner as borax and other materials or compositions have been heretofore used for the same purpose. I have found that the cryolite possesses the property of aiding in producing more effective and perfect welds than other materials, there being less burning of the iron or steel, and the joints being generally more perfect.

I claim as my invention, and desire to secure by Letters Patent—

The welding of iron or steel by the aid of cryolite, as set forth.

J. P. PRICE.

Witnesses:
G. B. POTTENGER.
S. R. BANDE.